3,287,288
LOW FRICTION COMPOSITION CONTAINING A RESINOUS BINDER AND DEGRADED POLYTETRAFLUOROETHYLENE PARTICLES
Victor G. Reiling, Dayton, Ohio, assignor to The Duriron Company, Inc., Dayton, Ohio, a corporation of New York
No Drawing. Continuation of application Ser. No. 117,267, June 15, 1961. This application Sept. 21, 1964, Ser. No. 398,114
2 Claims. (Cl. 260—4)

The present application is a continuation of application Serial No. 117,267, filed June 15, 1961 and now abandoned, which is in turn a continuation-in-part of Serial No. 737,208, filed May 28, 1958, now abandoned.

The present invention relates to a processed resinous powder which may be incorporated into a second plastic material for decreasing the surface friction thereof.

The invention is especially concerned with fluorocarbon resin polymers such as the tetrafluoroethylene resin sold under the trademark of Teflon, which are available commercially in powdered form, and may be processed by compacting the powder to produce a "preform" followed by sintering or baking of the preform at a relatively high temperature.

Materials of the above type are characterized, among other properties, by extreme chemical inertness and also very low frictional properties, even in the absence of lubricants, which render them especially useful in bearings, ball joint sockets, and sleeve bearings. However, the tendency of such fluorocarbon polymers to deform under a load introduces limitations on the use of tetrafluoroethylene resins in such applications.

In accordance with the present invention, a powdered tetrafluoroethylene resin may be mixed with a parent material of the thermosetting or thermoplastic variety to produce a plastic ball joint socket, sleeve bearing or other type bearing which possesses a low surface friction characteristic and considerable resistance to deformation under a load. The plastic materials which may be used as a parent to which the polytetrafluoroethylene powder is added include vinyl resins, polystyrene resins, acrylate resins, phenol formaldehyde resins, urea-formaldehyde resins, polyester resins, alkyd or Glyptal resins, polyethylene resins, polyvinylbutyral resins, natural rubber, fluorinated rubber, styrene butadiene resins, melamine resins, nylon, propylene resins and a recently developed polyoxymethylene resin sold under the trademark of "Delrin." Each of the above materials may be employed as a parent since they exhibit considerable resistance to cold flow and are readily processed subsequent to the incorporation of the polytetrafluoroethylene additive in accordance with the invention to produce a product which retains the resistance of the parent material while possessing to a great degree the low frictional characteristics of the tetrafluoroethylene additive.

Thus it is an object of this invention to provide a composite plastic member including a plastic material having incorporated therein an additive plastic material wherein the surface friction of the parent material is reduced by the presence of the additive.

It is another object of this invention to provide an additive of low frictional properties adapted to be uniformly and evenly distributed throughout a parent plastic having substantially higher frictional properties whereby the surface friction of the parent plastic is significantly reduced without significantly reducing the characteristics of the parent material such as deformation under load, flexural strength and the like.

A further object of this invention is to provide an article of manufacture including a parent plastic material having a permanent type lubricant incorporated therein, the lubricant being in the form of a powdered plastic additive having a low coefficient of friction whereby the surface friction of the parent plastic is reduced.

Other objects and advantages of the invention will be apparent from the following description and the appended claims.

The additive fluorocarbon polymers with which this invention is concerned have unusually stable chemical bonds as is exhibited by their very low chemical activity. The virgin material, when in powdered form, possesses the capability of being treated to form a stable product having a remarkable bond stability. The normal procedure in treating the material involves compacting the powder by application of pressure to the material, resulting in a "preform." During this compacting operation, the individual particles of the powder are not as yet chemically bound together and are merely held together by the forces applied during compacting. Upon sintering of the preform, the compacted material cross-links, and the individual particles are bound together by extremely stable chemical bonds.

If the sintered product is cut up into sheets which are then stacked in a pile, and the pile is subsequently heat treated to a temperature about 720° F. which is the gel point of the sintered material, the sheet will be joined together by bonds which are approximately as stable as those of the original sintered material. The bonding capability of the virgin powdered material or the comminuted sintered material is such that if these powdered or comminuted materials are incorporated into a parent plastic, and the mixture is processed in accordance with well known techniques, the particles of the virgin or sintered additive tend to recombine and form globules which are unevenly distributed throughout the parent material. This tendency of the fluorocarbon resins to recombine or agglomerate increases the difficulty in blending and processing since agglomeration may occur to such an extent as to reduce the strength of the parent material due to the presence of relatively large globules of the additive within the parent. Moreover, with the use of powdered or comminuted virgin material, a product may result wherein the lubricating additive is distributed unevenly throughout the parent thereby producing a product having non-uniform surface friction characteristics, that is, a portion of the surface may have a relatively high friction characteristic while a neighboring portion of the surface may exhibit a relatively low friction characteristic.

In accordance with the principles of the present invention, the above disadvantages have been overcome by pretreating the virgin powdered or comminuted sintered material, or scrap material, and combinations thereof, by exposure to a temperature significantly in excess of the gel point of the material for a period of time sufficient to reduce the bonding capabilities thereof without affecting reduction of the chemical inactivity and low coefficient of friction. This pretreated material is then comminuted to a fine particle size and may be added to a parent plastic by distributing it therein to impart the desired surface lubricity to the parent material. The pretreated powdered material, which will hereinafter be referred to as the additive, may be distributed evenly and uniformly throughout the parent material, since the pretreating procedure not only reduces the tendency of the additive to agglomerate when dispersed throughout a parent plastic, but also allows the additives to be ground or comminuted to a finer particle size than is possible with the virgin or sintered material, or the scrap material. Thus the combination of reduction in particle size and a reduction in the bonding capabilities of the additive results in a low friction additive wherein the additive is evenly and uniformly distributed throughout the parent.

In a preferred embodiment of the present invention, the fluorocarbon polymer is pretreated by heating the material at a temperature significantly in excess of its gel point for a period of time sufficient to cause appreciable degradation thereof, which is exhibited by the decrease in tensile and impact strength. In the case of polytetrafluoroethylene resins, such degradation may be accomplished by heating the material at approximately 785° F. to 880° F. for a period of about two hours. When the polymer has been thus exposed to a temperature in excess of its gel point, the exceptional bonding capabilities heretofore present in the material are significantly reduced, as is evidenced by the decrease in tensile or impact strength.

One aspect of this invention involves the use of scrap material trimmed away from articles such as O-rings, sintered stock and the like. Thus scrap material heretofore discarded may be employed as an additive subsequent to the degrading procedure.

While the degrading procedure above described serves to reduce the bonding capabilities of the fluorocarbon polymer, it does not affect other desirable characteristics such as chemical inertness and low coefficient of friction. Of most significance is the fact that the degraded materials show no tendency to agglomerate, and thus the additive can be ground to a finer powder than the virgin or sintered material, thereby facilitating incorporation of the degraded material into the parent plastic to decrease the surface friction thereof without significantly reducing the desirable characteristics of the parent material.

In the compounding procedure, about 5 to 50% by volume, and preferably 5 to 20% by volume, of the powdered fluorocarbon polymer is added to the powdered parent material. The composite mixture is then processed in the appropriate way, as by injection molding or other technique, to form a product of the desired configuration. It is to be noted that use of the processed or degraded material operates to minimize the possibility of agglomeration during the processing of the composite parent and additive material.

The resulting product is a physical mixture of the additive in the parent plastic, and there is no chemical wetting or bonding of the parent and the additive. Further, the product exhibits a surface friction which is considerably less than that of the parent alone while retaining the strength and cold flow resistance of the parent. It is understood, that the amount of additive may be varied from 5 to 50% of the volume of the parent to impart lubricity to the composite mixture in accordance with the desired need.

Of the several possible parent materials mentioned above, the polyoxymethane polymer sold commercially under the trademark "Delrin" and the nylon type plastics are of particular interest due to their low moisture absorption, high impact resistance and resistance to cold flow. The addition of the processed powdered tetrafluoroethylene material to the polyoxymethane or nylon resin, while not significantly reducing the above mentioned characteristics, imparts sufficient lubricity to the exposed surface of the composite material to enable the use of such resins as low friction bearing surfaces as well as ball joint sockets, thus utilizing the high resistance to deformation under load which is characteristic of these compounds.

In a preferred embodiment of this invention, the pretreated fluorocarbon polymer is ground to a particle size of about 10 to 30 microns as determined by conventional screen particle determinations. The parent material, such as any of the above mentioned thermosetting and thermoplastic materials or combinations thereof, is ground into a powder, and approximately 5 to 25% of the pretreated powdered fluorocarbon polymer is added. The mixture is then blended or stirred to distribute the additive evenly throughout the parent, followed by molding techniques which are well known in the art according to the parent material being employed, to produce a product of desired size and configuration possessing the desired low friction surface.

Tests of several mixtures including "Delrin" and nylon polymers indicated that with the additive present in an amount of 5 to 25% by volume, the desired lubricity was imparted to the final product without significantly altering the processing techniques. Thus by employing conventional processing for the parent material, a variety of products are possible having decreased surface friction while retaining a significant amount of the hardness, deformation under load, compressive strength and stiffness of the parent material.

As noted, the invention is practiced by using processed fluorocarbon resins, and for reasons of economy it offers special advantages in the reuse of scrap material from preformed and sintered parts. Furthermore, the processed material which has been previously sintered is easier to regrind than the virgin material, which is another advantage. It is not essential, however, to grind the scrap material before its is reheated, although from the standpoint of convenience of handling it may be desirable to chop it into comparatively small pieces before the reheating treatment, and it is then also somewhat simpler to handle during the subsequent regrinding.

While this invention has been described with reference to parent plastic materials, it is understood that the processed fluorocarbon polymer may be suspended in a liquid and gaseous vehicle as is disclosed in my copending application Serial No. 737,208, filed May 23, 1958.

While the products and method herein described constitute preferred embodiments of the invention, it is to be understood that the invention is not limited to these precise products and method, and that changes may be made therein without departing from the scope of the invention which is defined in the appended claims.

What is claimed is:

1. A composition of matter consisting essentially of finely divided degraded polytetrafluoroethylene resin particles and a parent material therefor, said parent material being selected from the group consisting of thermosetting and thermoplastic resins and combinations thereof, said degraded polytetrafluoroethylene resin being formed by heating polytetrafluoroethylene resin starting material at a temperature in excess of 785° F. for a period of time sufficient to cause appreciable degradation of said polytetrafluoroethylene starting material to a point such that the tensile strength of the degraded polytetrafluoroethylene is permanently substantially less than that of the starting material, and said degraded resin particles being present in an amount of 5 to 50% by volume of said parent resin and being uniformly and evenly distributed throughout said parent for reducing the surface friction thereof.

2. The method of reducing the surface friction of a parent material selected from the group consisting of thermosetting and thermoplastic resins and combinations thereof, comprising adding to said parent resin approximately 5 to 50% by volume of finely divided particles of degraded polytetrafluoroethylene resin, said degraded polytetrafluoroethylene resin being formed by heating polytetrafluoroethylene resin material at a temperature in excess of 785° F. for a period of time sufficient to cause appreciable degradation of said polytetrafluoroethylene starting material to a point such that the tensile strength of the degraded polytetrafluoroethylene is permanently substantially less than that of the starting material, and molding said parent with said degraded polytetrafluoroethylene resin particles present therein to produce a product having said particels of degraded polytetrafluoroethylene mechanically bonded to the parent resin and evenly and substantially uniformly distributed throughout the parent resin for reducing the surface friction thereof.

References Cited by the Examiner

UNITED STATES PATENTS

| | | | |
|---|---|---|---|
| 2,400,091 | 5/1946 | Alfthan | 252—14 |
| 2,847,711 | 8/1958 | Hibbard | 260—92.1 |
| 2,933,536 | 4/1960 | Wall et al. | 260—92.1 XR |
| 2,998,397 | 8/1961 | Riesing | 260—857 XR |
| 3,005,795 | 10/1961 | Busse et al. | 260—900 XR |

MURRAY TILLMAN, *Primary Examiner.*

G. F. LESMES, *Assistant Examiner.*